(12) United States Patent
Kline et al.

(10) Patent No.: US 10,948,578 B2
(45) Date of Patent: Mar. 16, 2021

(54) DISTINGUISHING HOLOGRAPHIC OBJECTS FROM PHYSICAL OBJECTS

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 182 days.

(21) Appl. No.: 16/156,295

(22) Filed: Oct. 10, 2018

(65) Prior Publication Data
US 2020/0116846 A1 Apr. 16, 2020

(51) Int. Cl.
| | |
|---|---|
| *G01S 13/04* | (2006.01) |
| *G06K 9/46* | (2006.01) |
| *G01S 15/04* | (2006.01) |
| *G01V 8/10* | (2006.01) |
| *H04N 5/225* | (2006.01) |
| *G01S 13/86* | (2006.01) |
| *G06K 9/00* | (2006.01) |
| *G06K 9/20* | (2006.01) |
| *G01S 13/89* | (2006.01) |

(Continued)

(52) U.S. Cl.
CPC .............. *G01S 13/04* (2013.01); *G01S 15/04* (2013.01); *G01V 8/10* (2013.01); *G06K 9/4661* (2013.01); *H04N 5/2256* (2013.01); *G01S 13/862* (2013.01)

(58) Field of Classification Search
None
See application file for complete search history.

(56) References Cited

U.S. PATENT DOCUMENTS

| | | | | |
|---|---|---|---|---|
| 4,172,632 A | * | 10/1979 | Holmes, Jr. .............. | G09B 9/38 359/465 |
| 4,716,417 A | * | 12/1987 | Grumet ................ | H01Q 17/001 343/708 |

(Continued)

OTHER PUBLICATIONS

Fisher; "Using Surfaces and Object Models to Recognize Partially Obscured Objects"; Department of Artifical Intelligence University of Edinburgh; 1983; 7 Pages.

(Continued)

*Primary Examiner* — Bernarr E Gregory
(74) *Attorney, Agent, or Firm* — Cantor Colburn LLP; Tihon Poltavets (57) ABSTRACT

Distinguishing between holographic and physical objects in an environment. Determining whether an object is holographic or physical begins with monitoring locating objects within an environment. When locating an object within the environment, an object can be identified as physical by detecting a shadow cast by the object, detecting a reflection of the electromagnetic (EM) wave directed at the object, and by detecting a reflection of a sound wave directed at the object. Otherwise, when locating an object within the environment, an object is identified as holographic as a result of the object not casting a shadow, not receiving a reflection of the EM wave from the object, and not receiving a reflection of the sound wave from the object. In one or more embodiments, actions upon a particular object can be determined based on whether the object is physical or holographic.

20 Claims, 8 Drawing Sheets

(51) Int. Cl.
*G01S 7/41* (2006.01)
*G01S 7/539* (2006.01)
*G01S 13/00* (2006.01)

(56) References Cited

U.S. PATENT DOCUMENTS

| | | | | |
|---|---|---|---|---|
| 4,924,235 A | * | 5/1990 | Fujisaka | G01S 13/42 |
| | | | | 342/158 |
| 4,958,330 A | * | 9/1990 | Higgins | G01S 15/87 |
| | | | | 367/88 |
| 4,969,131 A | * | 11/1990 | Harris, Jr. | G01S 7/539 |
| | | | | 367/107 |
| 5,181,254 A | * | 1/1993 | Schweizer | G01S 7/539 |
| | | | | 348/163 |
| 5,214,744 A | * | 5/1993 | Schweizer | G01S 7/52004 |
| | | | | 382/103 |
| 5,220,409 A | * | 6/1993 | Bures | G01V 8/22 |
| | | | | 250/221 |
| 5,347,376 A | * | 9/1994 | Chen | G03H 1/0404 |
| | | | | 359/28 |
| 6,275,181 B1 | * | 8/2001 | Kitayoshi | H01Q 9/16 |
| | | | | 342/74 |
| 6,841,780 B2 | * | 1/2005 | Cofer | G01B 11/25 |
| | | | | 250/341.1 |
| 7,349,104 B2 | | 3/2008 | Geng | |
| 8,743,654 B1 | * | 6/2014 | Sammelmann | G09B 9/56 |
| | | | | 367/7 |
| 9,798,007 B2 | * | 10/2017 | Sane | G01S 7/4808 |
| 10,234,554 B2 | * | 3/2019 | Stevens | G01S 13/90 |
| 2014/0224021 A1 | * | 8/2014 | Edwards | G01S 13/50 |
| | | | | 73/601 |
| 2017/0356993 A1 | * | 12/2017 | Lee | G01S 7/4802 |

OTHER PUBLICATIONS

Jinling et al.; "Research on Fast and Accurate Occlusion Detection Technology of Augmented Reality System"; The IEEE International Conference on Industrial Informatics; Jul. 13-16, 2008; pp. 111-116.
Vasil'ev et al.; "Coherent Optical Methods of Pattern Recognition and Scene Analysis Using the Correlation Function of Invariant Image Description"; Journal of Soviet Laser Research; vol. 10, No. 5; 1989; pp. 420-438.

* cited by examiner

DISTINGUISHING HOLOGRAPHIC OBJECTS FROM PHYSICAL OBJECTS

BACKGROUND

The invention relates generally to holographic objects, and more particularly, to distinguishing holographic objects from physical objects and then determining actions to execute based on whether objects are holographic or physical.

Today the technology exists for generating 3D interactive holograms. A 3D holographic object can appear in midair and even sound is perceived to come directly from a holographic object. For example, a holographic object can be made to appear amongst a group of real people as a speaker or as a part of a live audience. Moreover, the holographic image can be seen without any glass and can be animated such that the object moves from one place to another.

However, at some point assistance may be needed in distinguishing between real and holographic objects. For example, holographic people could co-mingle among real people to create confusion. Holographic solders could confuse an enemy or create a diversion. The same could be done with military equipment or with other objects. Thus, it is no longer practical to simply rely on human eyes and ears alone.

SUMMARY

According to a non-limiting embodiment, a method for determining whether an object is a holographic object or a physical object is provided. The method includes monitoring an environment for holographic and physical objects and locating an object within the environment. In response to locating the object within the environment, the method then includes directing at least one of light, sound and an electromagnetic (EM) wave toward the object. Next, the method then includes determining that the object is a physical object by at least one of: detecting a shadow cast by the object created by the light, detecting a reflection of the EM wave directed at the object, and detecting a reflection of a sound wave directed at the object. Otherwise, the method includes determining that the object is a holographic object as a result of one or more of the following: the object not casting a shadow, not receiving a reflection of the EM wave from the object, and not receiving a reflection of the sound wave from the object.

According to another non-limiting embodiment, a system for distinguishing between physical and holographic objects is provided. The system includes one or more cameras for detecting shadows cast from one or more objects in an environment and a sonic generator for directing sound at the one or more objects and a detector to detect reflections from the sound directed at the one or more objects. According to the system, an object is identified as a holographic object as a result of not detecting a shadow associated with the object and as a result of not detecting a reflection of a sound wave directed at the object. Also, another object is identified as a physical object as a result of detecting a shadow associated with the other object and as a result of detecting a reflection of a sound wave directed at the object. The method also includes a map of the environment identifying physical and holographic objects.

According to yet another non-limiting embodiment, a computer program product is provided. The computer program product includes a computer readable storage medium having program instructions embodied therewith, the program instructions executable by a computer processor to cause the computer processor to perform a method for distinguishing between physical and holographic objects. The method includes, in response to locating an object within an environment, directing at least one of light, sound and an EM wave toward the object and then determining that the object is a physical object by at least one of: detecting a shadow cast by the object created by the light, detecting a reflection of the EM wave directed at the object, and detecting a reflection of a sound wave directed at the object. Otherwise, the method includes determining that the object is a holographic object as a result of one or more of the following: not detecting a shadow being cast by the object, not receiving a reflection of the EM wave from the object, and not receiving a reflection of the sound wave directed at the object.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, modern holographic techniques allow for a holographic object to be generated by a computer system coupled to and controlling a holographic system. The holographic system includes a holographic apparatus having a holographic projector. The generated holographic objects may be visually nearly indistinguishable from real objects. Thus, holographic objects may be used nefariously or used to purposely create confusion as to what is real and what is not.

As described herein, one or more embodiments address shortcomings of the prior art by using a computer system and various detectors for distinguishing between holographic and physical objects in a particular environment. Depending on whether shadows, reflected sound waves or reflected electromagnetic (EM) waves are detected, a determination may be made as to whether objects are holographic or physical.

Figure 1:
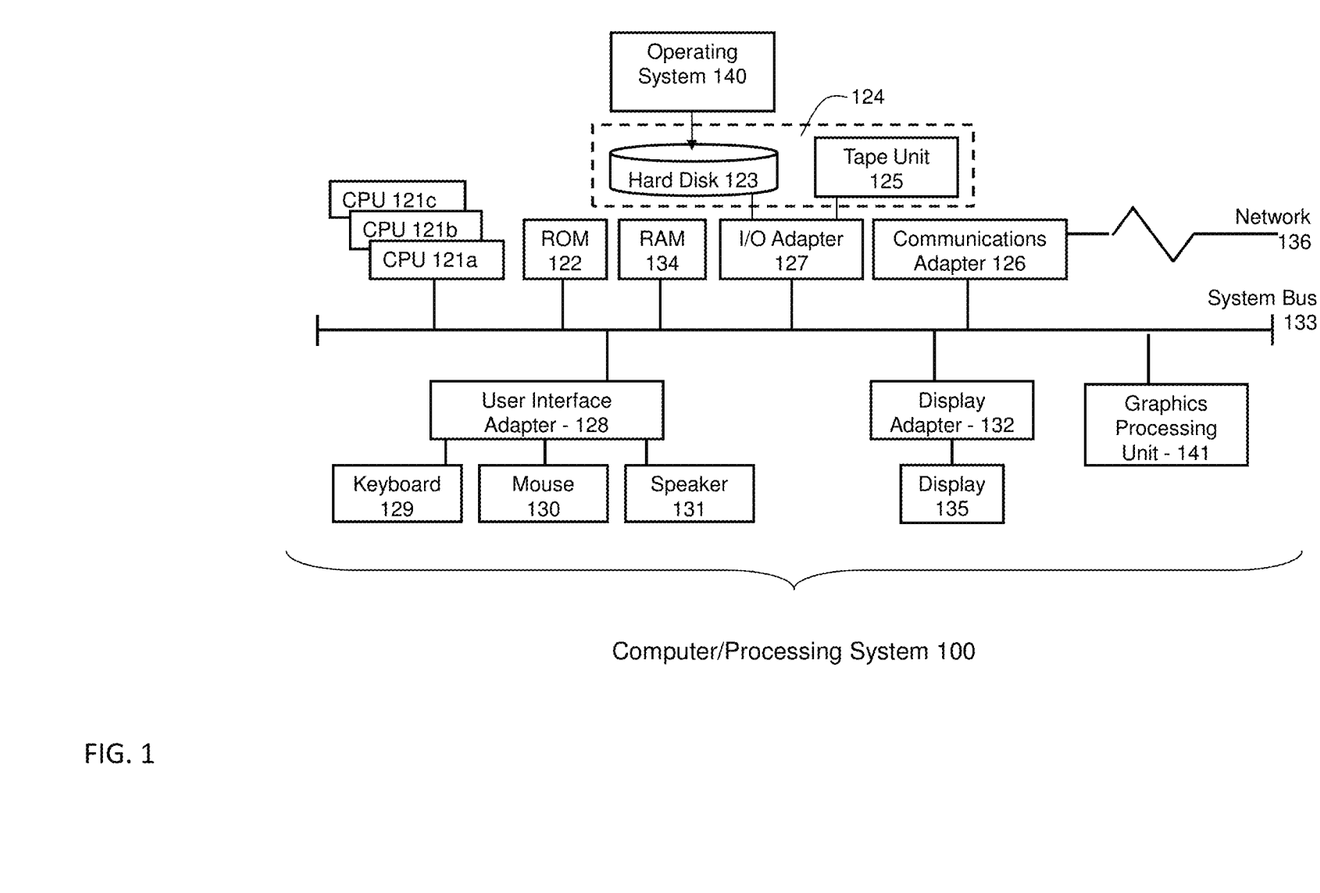
FIG. 1 depicts a block diagram illustrating an exemplary computer processing system that may be utilized to implement exemplary embodiments of the present invention.

Referring to FIG. 1, there is shown an embodiment of a processing system, commonly referred to as a computer system 100, configured as a personal computer for implementing the teachings herein. In this embodiment, the computer system 100 has one or more central processing units (processors) 121a, 121b, 121c, etc. (collectively or generically referred to as processor(s) 121). In one or more embodiments, each processor 121 may include a reduced instruction set computer (RISC) microprocessor. Processors 121 are coupled to system memory 134 and various other components via a system bus 133. Read only memory (ROM) 122 is coupled to the system bus 133 and may include a basic input/output system (BIOS), which controls certain basic functions of computer system 100.

FIG. 1 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 125 or any other similar component. I/O adapter 127, hard disk 123, and tape storage device 125 are collectively referred to herein as mass storage 124. Operating system 140 for execution on the processing system 100 may be stored in mass storage 124. A network adapter 126 interconnects bus 133 with an outside network 136 enabling the computer system 100 to communicate with other such systems. A screen (e.g., a display monitor) 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 121, storage capability including system memory 134 and mass storage 124, input means such as keyboard 129 and mouse 130, and output capability including speaker 131 and display 135. In one embodiment, a portion of system memory 134 and mass storage 124 collectively store an operating system coordinate the functions of the various components shown in FIG. 1.

Figure 2:
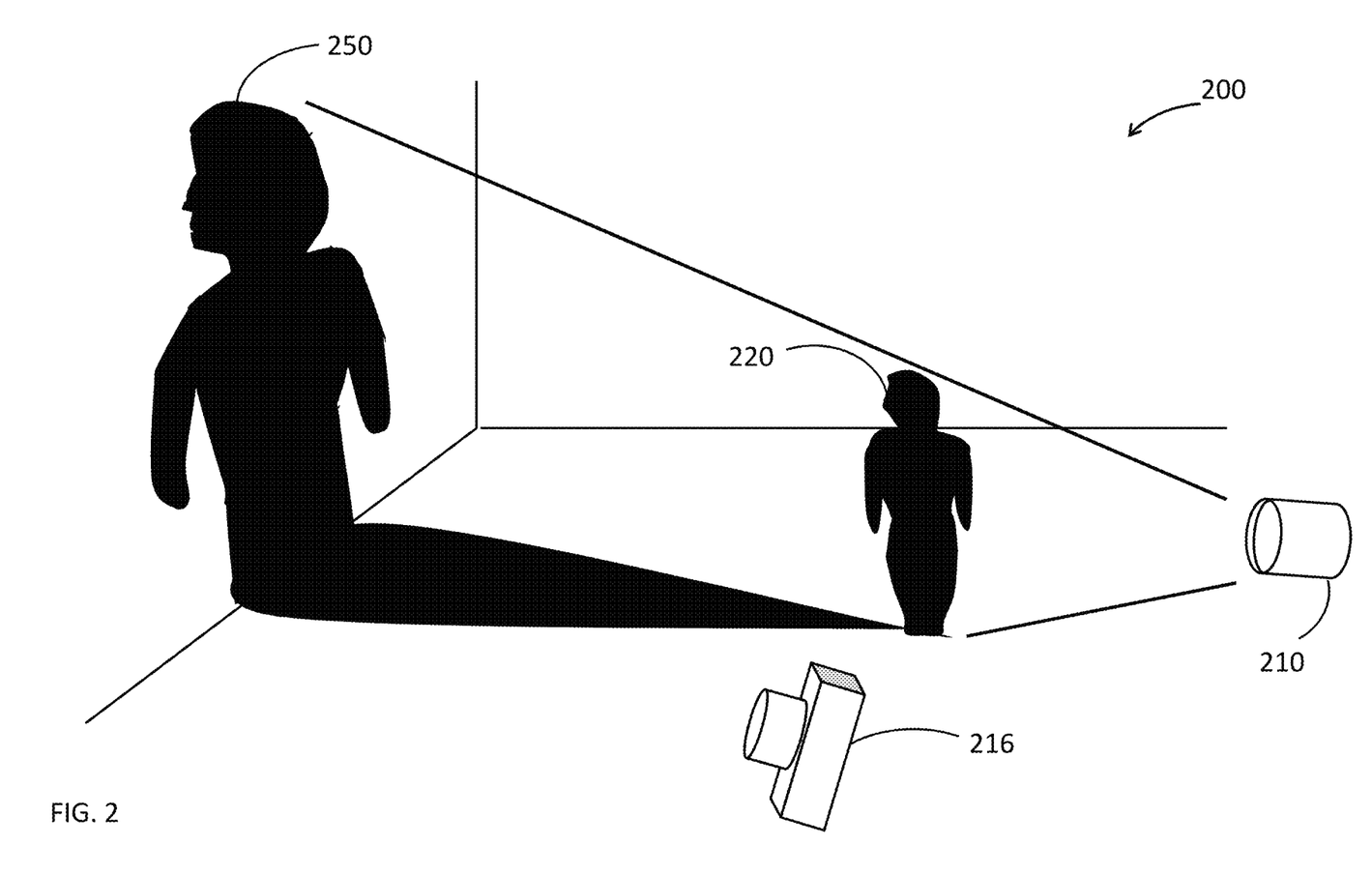
FIG. 2 is a perspective view of an exemplary environment with a physical object casting a shadow according to one or more embodiments of the present invention.

Referring to FIG. 2, the computer system 100 communicates with and operates one or more light sources 210 within an environment 200. The environment 200 may be an interior or exterior environment or any particular geographical area, building, room, office or other premises that might be expected to include holographic objects. The environment 200 also includes one or more detectors such as camera 216 for detecting the direction and length of shadows. Each detector/camera 216 communicates with and is operated by the computer system 100. The camera 216 is oriented and monitored by the computer system 100 for detecting the direction and length of shadows cast from objects such as object 220. Preferably the detector/camera 216 is offset from the light source 210 in order to more easily detect any shadows. Also, preferably an array of detectors/cameras are utilized in order to provide the capability of detecting nominal shadows.

Figure 3:
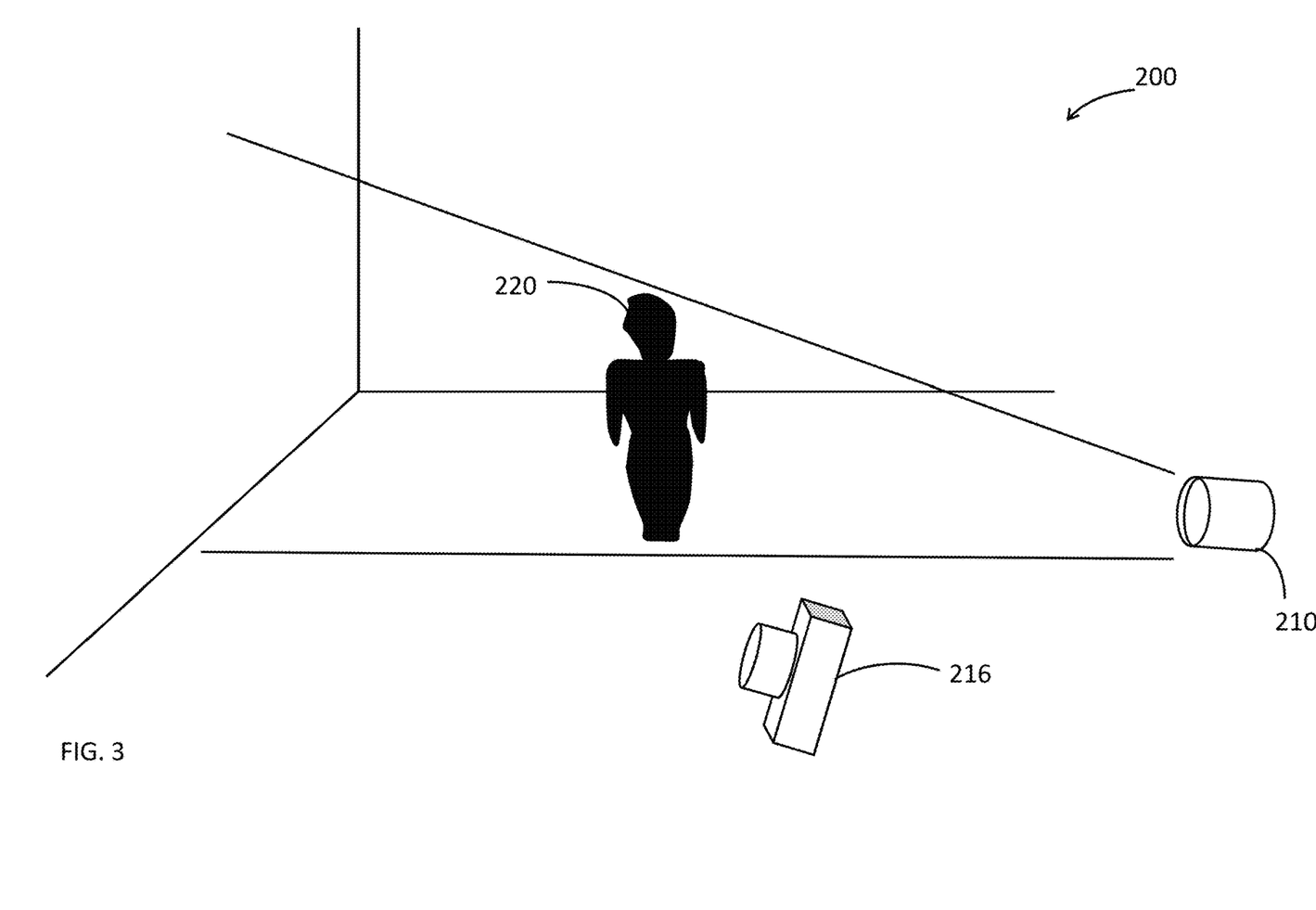
FIG. 3 is a perspective view of an exemplary environment with a holographic object highlighted with a light source without casting a shadow according to one or more embodiments of the present invention.

Still referring to FIG. 2, the object 220 is a physical object because the object 220 casts a shadow 250 as a result of the light from the light source 210. The computer system 100 orients and operates the light source 210 to determine whether a shadow can be detected by the camera 216. In the event that the camera 216 cannot detect a shadow from an object, then that object may be a holographic object as shown in FIG. 3.

Also, light from a natural source such as the sun or moon may also cast a shadow on a physical object that can be detected by a detector such as the camera 216. In one or more embodiments, for example, the direction and length of a shadow cast by an object as a result of the sun and the direction and length of a shadow cast by the same object and/or one or more other objects as a result of light from one or more light sources 210 may be used, individually or in combination, to ascertain whether the object is holographic or physical.

Figure 4:
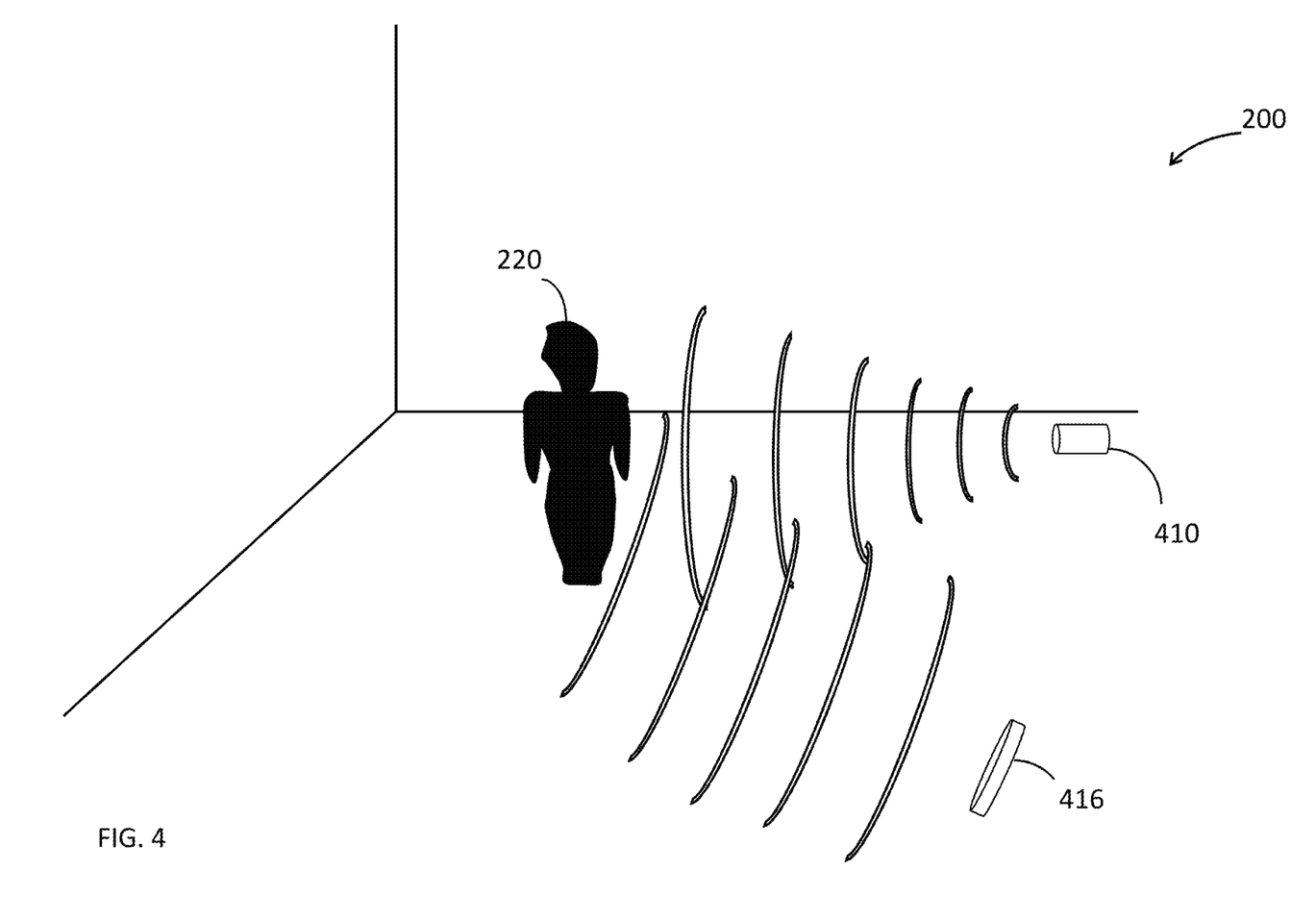
FIG. 4 is a perspective view of an exemplary environment with a physical object reflecting sound or electromagnetic (EM) waves according to one or more embodiments of the present invention.
Figure 5:
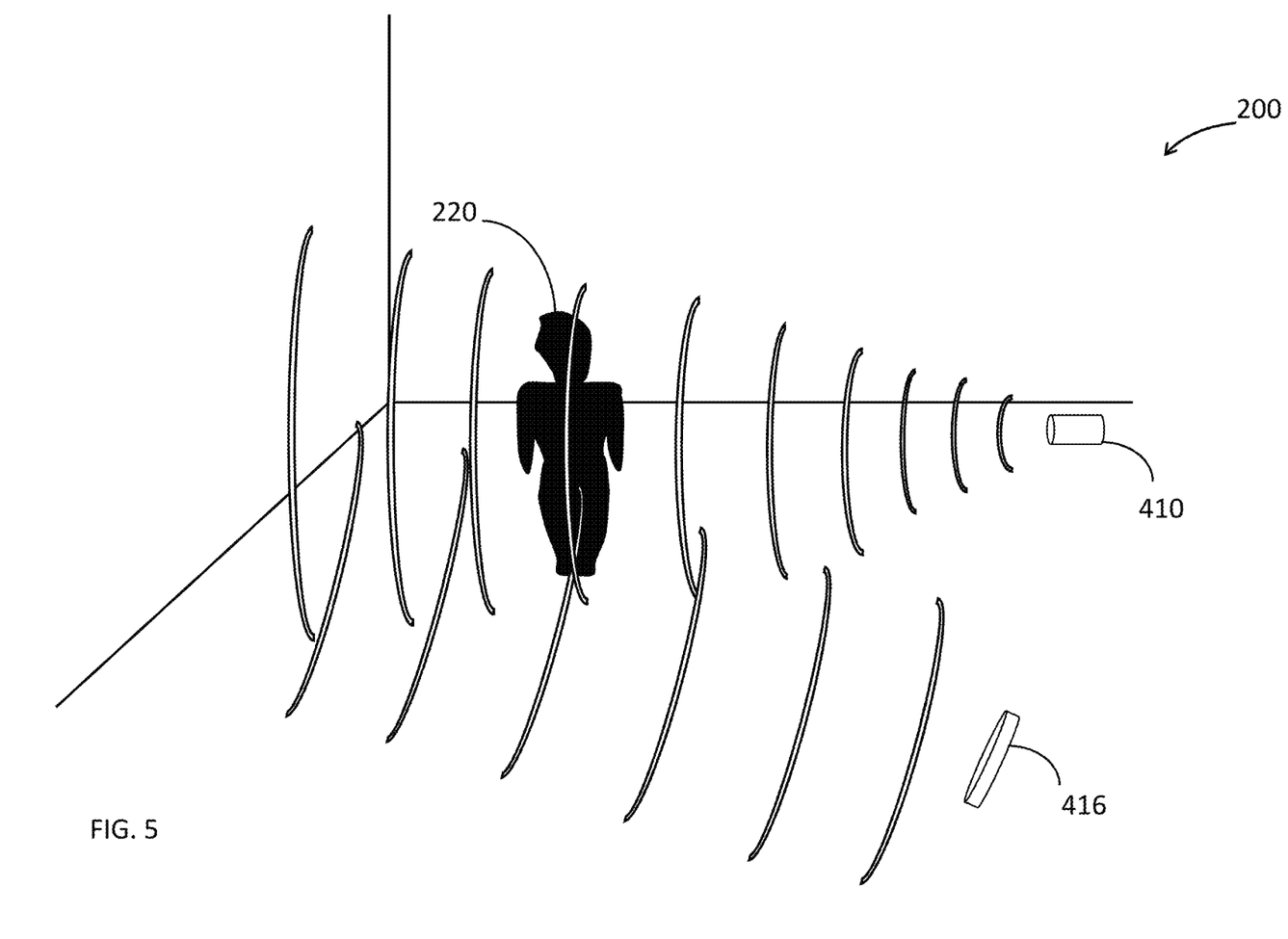
FIG. 5 is a perspective view of an exemplary environment where sound or EM waves pass through a holographic objected according to one or more embodiments of the present invention.

In FIG. 4, the computer system 100 communicates with and operates a wave source such as a sonic/sound or electromagnetic (EM) wave source 410 for generating sonic/sound or EM waves in the environment 200 to determine whether the object 220 is holographic or physical. The sound or EM waves from the wave source 410 are directed at a particular object such as object 220. The computer system 100 also communicates with and operates one or more detectors 416 for detecting waves reflected off of the object 220. Preferably each detector 416 is offset from the wave source 410 in order to more easily detect reflections from the object 220. If reflected sound or EM waves are detected at detector 416 within the amount of time or at a distance expected by the computer system 100, based on triangularization using the position and distance of the object 220 relative to the position and distance of the wave source 410 and the detector 416, then the object 220 is likely a physical object. However, as shown in FIG. 5, when sound or EM waves simply pass through the object 220, are not reflected back from an expected distance or within an expected time, then the object is likely holographic.

In one or more embodiments, a single light source could be used to direct light at multiple objects. In such case, via the light directed from the single light source, one or more objects casting shadows may be detected and possibly one or more other objects that do not cast shadows may also be detected. Also, in one or more embodiments, a single wave source could be used to direct waves at multiple objects. In such case, one or more objects may be detected as a result of the reflected waves and one or more other objects which do not reflect the wave may also be detected.

Figure 6:
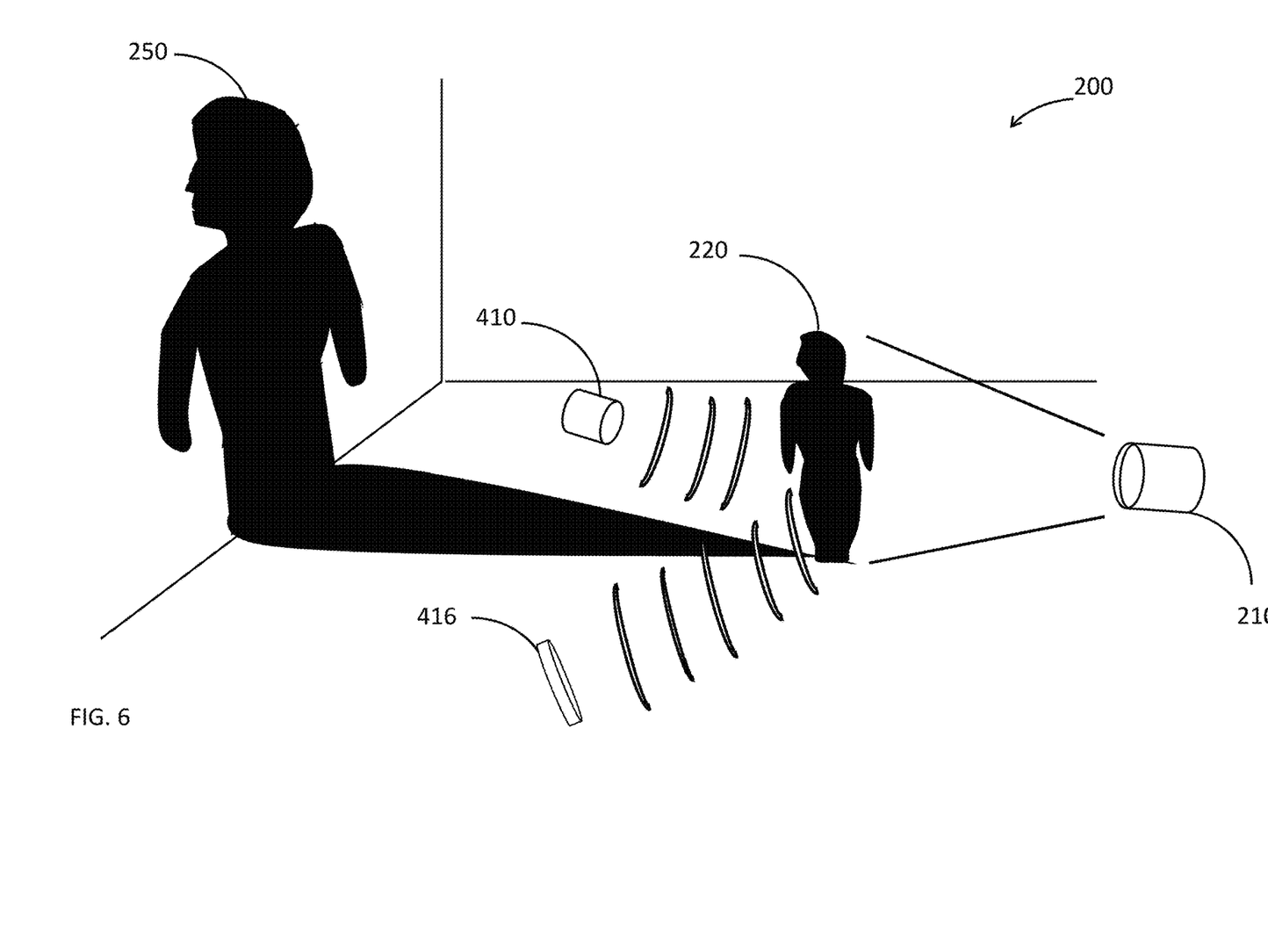
FIG. 6 is a perspective view of an exemplary environment where a physical object casts a shadow as a result of the light source and reflects sound or EM waves as a result of the sound or EM waves being directed at the physical object according to one or more embodiments of the present invention.

FIG. 6 depicts the exemplary environment 200 utilizing the light source 210 and camera 216 in combination with the wave source 410 and detector 416 to determine whether the object 220 is a holographic object or a physical object. In one or embodiments, the light source 210 with camera 216 may be used in combination with multiple sound and/or EM wave sources 410 with detectors 416. In FIG. 6, the object 220 casts a shadow 250 and reflected waves are detected at detector 416 evidencing that the object 220 is a physical object. In one or more embodiments, the light source 210 and wave source 410 are positioned relative to one another within the environment 200 such that the light, sound and/or EM waves are directed at different surfaces or sides of the object 220.

Figure 7:
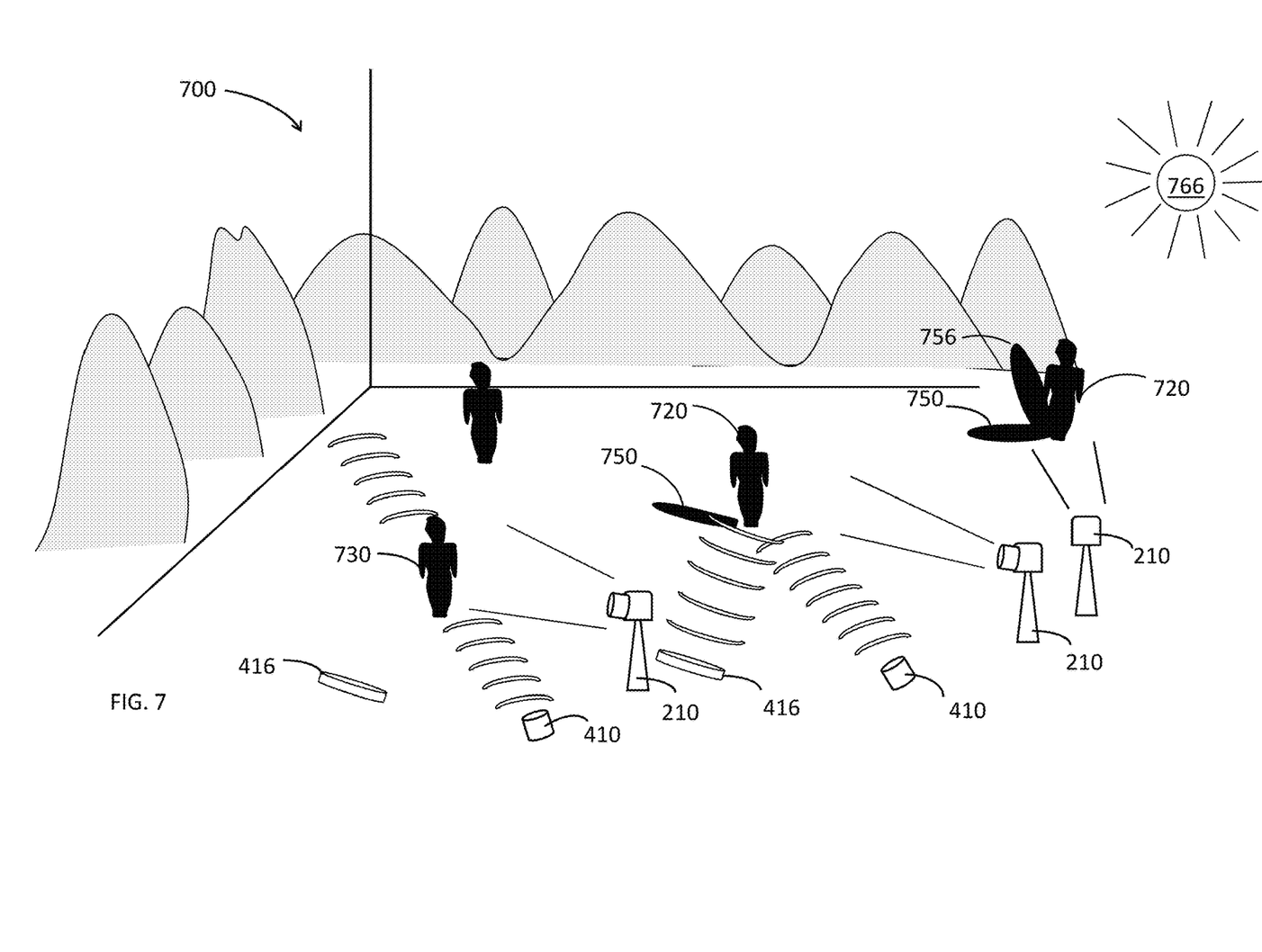
FIG. 7 is a perspective view of an exemplary environment having both physical and holographic objects where the physical objects cast shadows and/or reflect sound or EM waves and the holographic objects do not cast shadows and fail to reflect waves according to one or more embodiments of the present invention.

FIG. 7 is a perspective view of an exemplary environment 700 having both physical and holographic objects where the physical objects cast shadows and/or reflect sound or EM waves and the holographic objects do not cast shadows and fail to reflect waves according to one or more embodiments of the present invention. The environment 700 may include any number of light sources 210 and corresponding cameras 216 as well as any number of sound or EM wave sources and corresponding detectors 416. FIG. 7 depicts light sources 210 directing light and wave sources 410 generating sound or EM waves at objects. Objects 720 appear to be physical objects as a result of shadows 750. Also, at least one of the physical objects 720 appears to also cast a shadow 756 as a result of the sun 766 overhead. Each of the shadows 750, 756 are in the position expected and are the length expected based on the corresponding light source 210 and on the sun 766 which further evidences that the objects 720 are physical objects.

FIG. 7 also depicts a holographic object 730. A light source 210 directs light at the holographic object 730 and the wave source 410 directs sound and/or EM waves at the object 730. However, holographic object 730 neither casts a shadow nor reflects waves to the detector 416 which evidences that object 730 is holographic.

In one or more embodiments, the location of holographic objects and physical objects can be determined by the computer system 100 via the light source 210 and the camera 216 as well as the wave source 410 and the detector 416. Depending on the number of sources directed at a particular object, triangulation can be used to determine the location of the particular object. The locations of various holographic and physical objects can then be mapped for a particular environment. For example, a coordinate map of the locations of the holographic and physical objects can be generated by the computer system 100 for display. Also, for example, a corresponding three-dimensional coordinate map of the physical objects 720 and the holographic objects 730 could correspond with the environment 700. Also, the map could include coordinates of objects that have not yet been determined as either holographic or physical or that could not be satisfactorily determined as either holographic or physical. Once one or more objects have been located within an environment, those objects can continue to be monitored by using the light sources 210/cameras 216 and the wave sources 410/detectors/416.

Also, in one or more embodiments, upon determining that one or more holographic objects exist in an environment, the source generating a particular holographic object can be determined by releasing a substance, such as a volatile substance, including smoke and steam, into the environment with the holographic object. The substance is preferably optically opaque and released in proximity of the holographic object so that the released substance highlights or makes visible a light path leading to the source of the holographic object. Display or projection of a holographic object or image requires a clean line of sight in order for light to travel from the source to the holographic object. Thus, the released substance allows tracing of the light path from the holographic object directly back to a holographic projector generating the holographic object. The sources generating holographic objects may be mapped as well.

In one or more embodiments, upon determining that an object is either holographic or physical, the computer system 100 can also determine, autonomously or via input received via a user, whether an action should be taken in support of either one or both the holographic object and the physical object. Also, the computer system 100 can determine, autonomously or via input received via a user, whether either the holographic object or the physical object should be disrupted. In one or more embodiments, the determination as to what action may be taken, if any, toward either a holographic or physical object may be based on an object's reaction to having light from a light source directed at it or having sound or EM waves directed at it. For example, the determination as to what action may be taken may be based on whether an object reacts to light or sound directed toward it by redirecting or reorienting into a particular direction or orientation.

For example, the computer system 100 can execute actions in support of or against a particular holographic object. The computer system 100 can issue commands or instructions directing that no overt action be taken toward a holographic object in order to support the holographic object. In contrast, in order to disrupt a holographic object, the source generating the holographic object could be disabled or the light projected from the source could be blocked. Also, an adverse holographic object may itself be masked or blocked by generating a counter-holographic object over the top of, or in close proximity to, the adverse holographic object.

Also, action may be taken in support of a real physical object. The computer system 100 could initiate a positive engagement by establishing communication with the physical object. Intentions and/or identities could be requested or stated and then acknowledged. In contrast, actions could be taken to disrupt one or more physical objects such as the computer system 100 issuing commands or messages directing other physical objects to intercept, block or disable a targeted physical object.

Figure 8:
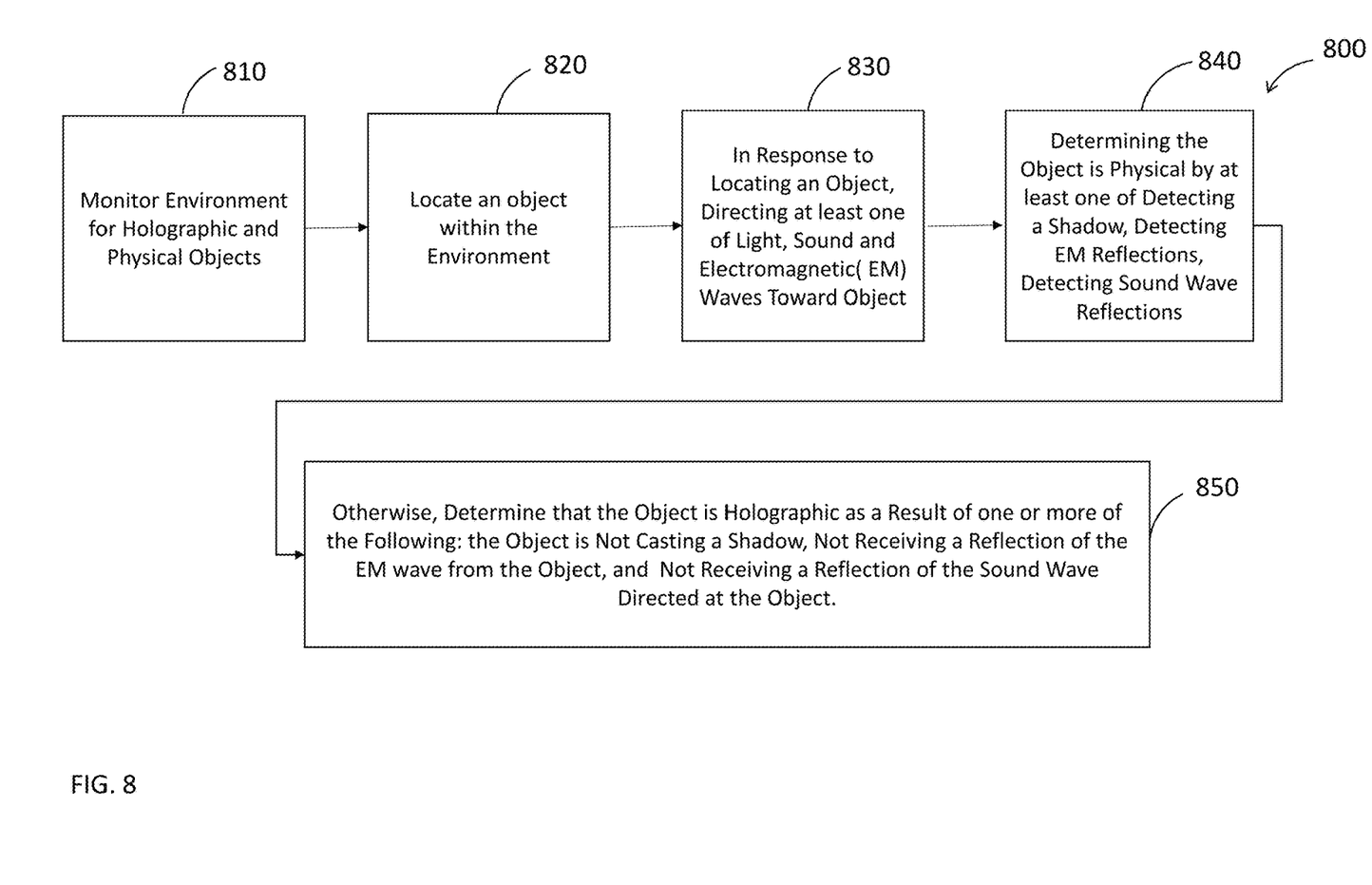
FIG. 8 is a flow diagram illustrating a method for determining whether an object is a holographic object or a physical object according to one or more embodiments of the present invention.

Turning to FIG. 8, one or more embodiments may include a method 800 for determining whether an object is a holographic object or a physical object. The flow diagram of FIG. 8 illustrates the method 800 that includes process block 810 for monitoring an environment for holographic and physical objects and process block 820 for locating an object within the environment. At process block 830 the method 800 includes, in response to locating the object within the environment, directing at least one of light, sound and an electromagnetic (EM) wave toward the object. Then the method 800 includes process block 840 for determining that the object is a physical object by at least one of: detecting a shadow cast by the object created by the light, detecting a reflection of the EM wave directed at the object, and detecting a reflection of a sound wave directed at the object. Otherwise, the method 800 includes process block 850 for determining that the object is a holographic object as a result of one or more of the following: the object is not casting a shadow, not receiving a reflection of the EM wave from the object, and not receiving a reflection of the sound wave directed at the object.

The method 800 may include one or more additional steps such as disrupting a holographic object, supporting a physical object and locating the source generating a holographic object. The method 800 may also include releasing a volatile substance in order to highlight and observe a light path leading to the source of a holographic object. The method 800 may further include generating a coordinate map of locations of holographic and physical objects within one or more particular environments.

Various technical benefits are achieved using the system and methods described herein, including the capability of providing enhanced performance for applications with exclusive access to the co-processors while also allowing applications that do not need performance access to accelerators when shared access is available. In this manner, the computer system can realize performance gains through the use of co-processors in the system, thereby improving overall processing speeds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining whether an object is a holographic object or a physical object, the method comprising:
  monitoring an environment for holographic and physical objects;
  locating an object within the environment; and
  in response to locating the object within the environment, directing at least one of light, sound and an electromagnetic (EM) wave toward the object;
  determining that the object is a physical object by at least one of:
  detecting a shadow cast by the object created by the light;
  detecting a reflection of the EM wave directed at the object; and
  detecting a reflection of a sound wave directed at the object; and
  otherwise, determining that the object is a holographic object as a result of one or more of the following:
    the object is not casting a shadow;
    not receiving a reflection of the EM wave from the object; and
    not receiving a reflection of the sound wave from the object.

2. The method of claim 1 further comprising disrupting the holographic object.

3. The method of claim 1 further comprising determining an action in support of the physical object.

4. The method of claim 1 further comprising, if the object is a holographic object, locating a source of the holographic object.

5. The method of claim 4 wherein locating a source of the holographic object comprises tracing a light path from the holographic object to a holographic projector.

6. The method of claim 4 wherein locating a source of the holographic object comprises releasing a volatile substance into the environment in order to observe a light path leading to the source of the holographic object.

7. The method of claim 1 further comprising determining a location of the holographic object.

8. The method of claim 1 further comprising establishing a coordinate map of locations of holographic and physical objects.

9. The method of claim 1 further comprising directing the light at a plurality of objects and detecting that one or more objects of the plurality of objects cast a shadow and that one or more other objects of the plurality of objects do not cast a shadow.

10. The method of claim 1 further comprising directing the sound wave at a plurality of objects and detecting that one or more objects of the plurality of objects reflects the sound wave and that one or more other objects of the plurality of objects do not reflect the sound wave.

11. A system for distinguishing between physical and holographic objects, the system comprising:
   one or more cameras for detecting shadows cast from one or more objects in an environment;
   a sonic generator for directing sound at the one or more objects and a detector to detect reflections from the sound directed at the one or more objects;
   one or more processors configured to:
   identify object as a holographic object as a result of not detecting a shadow associated with the object and as a result of not detecting a reflection of the sound directed at the object, and
   identify another object as a physical object as a result of detecting a shadow associated with the other object and as a result of detecting a reflection of the sound directed at the object; and
   depict, on a map of the environment, physical and holographic objects.

12. The system of claim 11 further comprising a detector for detecting electromagnetic (EM) waves reflected from one or more objects.

13. The system of claim 11 further comprising at least one light source for projecting the light at the one or more objects.

14. The system of claim 11 further comprising a volatile substance for release into the environment, wherein the volatile substance when released into the environment highlights a light path leading to a source generating one or more holographic objects.

15. A computer program product comprising a computer readable storage medium having program instructions embodied therewith, the program instructions executable by a computer processor to cause the computer processor to perform a method for distinguishing between physical and holographic objects, comprising:
   in response to locating an object within an environment, directing at least one of light, sound and an electromagnetic (EM) wave toward the object;
   determining that the object is a physical object by at least one of:
   detecting a shadow cast by the object created by the light;
   detecting a reflection of the EM wave directed at the object; and
   detecting a reflection of a sound wave directed at the object; and
   otherwise, determining that the object is a holographic object as a result of one or more of the following:
   not detecting a shadow being cast by the object;
   not receiving a reflection of the EM wave from the object; and
   not detecting a reflection of the sound wave from the object.

16. The computer program product of claim 15 wherein the method further comprises disrupting the holographic object.

17. The computer program product of claim 15 wherein the method further comprises determining an action in support of the physical object.

18. The computer program product of claim 15 wherein the method further comprises locating a source of the holographic object by tracing a light path from the holographic object to a holographic projector.

19. The computer program product of claim 15 wherein the method further comprises releasing a volatile substance into the environment in order to highlight a light path leading to a source of the holographic object.

20. The computer program product of claim 15 wherein the method further comprises generating a coordinate map of locations of holographic and physical objects.

* * * * *